(12) United States Patent
    Zhou et al.

(10) Patent No.: US 11,641,547 B2
(45) Date of Patent: May 2, 2023

(54) SOUND BOX ASSEMBLY, DISPLAY APPARATUS, AND AUDIO OUTPUT METHOD

(71) Applicant: BEIJING XIAOMI MOBILE SOFTWARE CO., LTD., Beijing (CN)

(72) Inventors: Yihui Zhou, Beijing (CN); Fuyu Wang, Beijing (CN); Shihwei Lu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 137 days.

(21) Appl. No.: 17/240,179

(22) Filed: Apr. 26, 2021

(65) Prior Publication Data
    US 2022/0103946 A1    Mar. 31, 2022

(30) Foreign Application Priority Data

Sep. 28, 2020   (CN) .......................... 202011043128.8

(51) Int. Cl.
    *H04R 5/02*   (2006.01)
    *H04R 1/26*   (2006.01)
    *H04R 1/28*   (2006.01)

(52) U.S. Cl.
    CPC ................. *H04R 5/02* (2013.01); *H04R 1/26* (2013.01); *H04R 1/2842* (2013.01); *H04R 2205/024* (2013.01); *H04R 2499/15* (2013.01)

(58) Field of Classification Search
    CPC .......... H04R 2499/15; H04R 2201/025; H04R 1/025
    See application file for complete search history.

(56) References Cited

U.S. PATENT DOCUMENTS

| 2003/0048918 A1* | 3/2003 | Dillon ...................... H04R 1/02 361/600 |
| 2007/0036369 A1* | 2/2007 | Davi ...................... H04R 1/023 381/190 |

(Continued)

FOREIGN PATENT DOCUMENTS

| CN | 108833815 A | 11/2018 |
| CN | 110753196 A |  2/2020 |

(Continued)

OTHER PUBLICATIONS

Indian Patent Application No. 202144017752, Office Action dated Apr. 29, 2022, 5 pages.

(Continued)

*Primary Examiner* — Kile O Blair
(74) *Attorney, Agent, or Firm* — Cozen O'Connor (57) ABSTRACT

A sound box assembly for a display apparatus, includes: a housing defining a chamber therein, and a connecting part connected to the housing, and being configured to be connected with the display apparatus; and a loudspeaker arranged in the chamber of the housing, a sound-image center being disposed at a center position of the display apparatus when the loudspeaker playing sound. The loudspeaker includes a squawker arranged at a middle portion of the housing, a woofer and a tweeter. One of the woofer and the tweeter is arranged above the squawker and the other one of the woofer and the tweeter is arranged below the squawker.

18 Claims, 9 Drawing Sheets

(56) References Cited

U.S. PATENT DOCUMENTS

| | | | |
|---|---|---|---|
| 2007/0200313 A1* | 8/2007 | Tazreiter | B61D 23/025 |
| | | | 280/166 |
| 2009/0312849 A1 | 12/2009 | Cosgrove et al. | |
| 2010/0246873 A1* | 9/2010 | Chen | H04R 5/02 |
| | | | 381/182 |
| 2021/0152774 A1* | 5/2021 | Li | G06F 1/1688 |

FOREIGN PATENT DOCUMENTS

| | | |
|---|---|---|
| CN | 110753197 A | 2/2020 |
| JP | S56102190 A | 8/1981 |
| JP | S5911095 A | 1/1984 |
| JP | 2004361666 A | 12/2004 |
| JP | 2004363952 A | 12/2004 |
| JP | 2007104112 A | 4/2007 |
| JP | 2008153780 A | 7/2008 |
| JP | 4390760 B2 | 12/2009 |
| KR | 19990013934 U | 4/1999 |
| KR | 19990075845 A | 10/1999 |
| KR | 20060061638 A | 6/2006 |
| KR | 101175514 B1 | 8/2012 |
| KR | 20140010834 A | 1/2014 |
| WO | WO 2014082368 A1 | 6/2014 |

OTHER PUBLICATIONS

Korean Patent Application No. 10-2021-0049732, Office Action dated Apr. 22, 2022, 6 pages.
Korean Patent Application No. 10-2021-0049732, English translation of Office Action dated Apr. 22, 2022, 7 pages.
Japanese Patent Application No. 2021-076675, Office Action dated May 31, 2022, 4 pages.
Japanese Patent Application No. 2021-076675, English translation of Office Action dated May 31, 2022, 5 pages.
European Patent Application No. 21170424.2 extended Search and Opinion dated Oct. 18, 2021, 15 pages.

* cited by examiner

SOUND BOX ASSEMBLY, DISPLAY APPARATUS, AND AUDIO OUTPUT METHOD

CROSS-REFERENCE TO RELATED APPLICATION

This application claims the benefit of priority to Chinese Patent Application No. 202011043128.8, filed on Sep. 28, 2020, the contents of which are incorporated herein by reference in their entirety.

TECHNICAL FIELD

The present disclosure relates to a field of audio technology, and more particularly, to a sound box assembly, a display apparatus, and an audio output method.

BACKGROUND

At present, with the development of science and technology, a screen thickness of a display apparatus such as a television is getting thinner and lighter, such that a volume and a mounting position of a component configured to play sound in the display apparatus are restricted. In order to meet preferred criteria for the thickness and weight of the display apparatus, a loudspeaker arranged in the display apparatus may not have sufficient space for playing bass. The loudspeaker is arranged at various locations in a display apparatus, including a lower portion of the front side or the back side of the display apparatus. The loudspeaker may be facing downwards, rearwards or sideways.

SUMMARY

According to a first aspect of the embodiments of the present disclosure, a sound box assembly for a display apparatus is provided. The sound box assembly includes: a housing defining a chamber therein, and a connecting part connected to the housing and configured to be connected with the display apparatus; and a loudspeaker arranged in the chamber of the housing, a sound-image center being disposed at a center position of the display apparatus when the loudspeaker playing sound. The loudspeaker includes: a squawker arranged at a middle portion of the housing; and a woofer and a tweeter. One of the woofer and the tweeter is arranged above the squawker, and the other one of the woofer and the tweeter is arranged below the squawker.

According to a second aspect of the embodiments of the present disclosure, a display apparatus is provided, and includes a screen and two sound box assemblies arranged on both sides of the display apparatus, respectively. The sound box assembly includes: a housing defining a chamber therein, and a connecting part connected to the housing and configured to be connected with the display apparatus; and a loudspeaker arranged in the chamber of the housing, a sound-image center being disposed at a center position of the display apparatus when the loudspeaker playing sound. The loudspeaker includes: a squawker arranged at a middle portion of the housing; and a woofer and a tweeter. One of the woofer and the tweeter is arranged above the squawker, and the other one of the woofer and the tweeter is arranged below the squawker.

According to a third aspect of the embodiments of the present disclosure, an audio output method for a display apparatus is provided. The display apparatus includes a screen and two sound box assemblies arranged on both sides of the screen, respectively. The audio output method includes: detecting an audio output state of the sound box assembly; driving the sound box assembly to move from a first position to a second position when the sound box assembly is in the audio output state; and driving the sound box assembly to move from the second position to the first position when the sound box assembly exits the audio output state. The first position is disposed on a back side of the screen, and the second position is disposed on a left or right side of the screen.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

In the related art, a loudspeaker is arranged at a lower portion of a display apparatus, and faces downwards, or arranged on a back side of the display apparatus, and faces rearwards or sideways. In the above ways, a sound needs to reflected and diffused so as to be heard by a viewer, such that the sound quality is seriously damaged, thereby resulting in that the sound and a sound image received by a user watching the display apparatus are separated from a position of a screen. The sound image, also known as a virtual sound source or a sensory sound source, refers to a position of a sound source that is virtualized based on the sound heard by the user after he/she hears the sound. When using the display apparatus in the above related art, the user watches the image displayed by the screen and also listens to the sound output from the loudspeaker of the display apparatus. However, the position of the sound source virtualized based on the sound is not at a position of the image, thus resulting in a problem of separation of the sound and the image, which causes a poor user experience.

If the sound quality is improved through an external sound box, the cost will be increased and an additional space is required.

Figure 1:
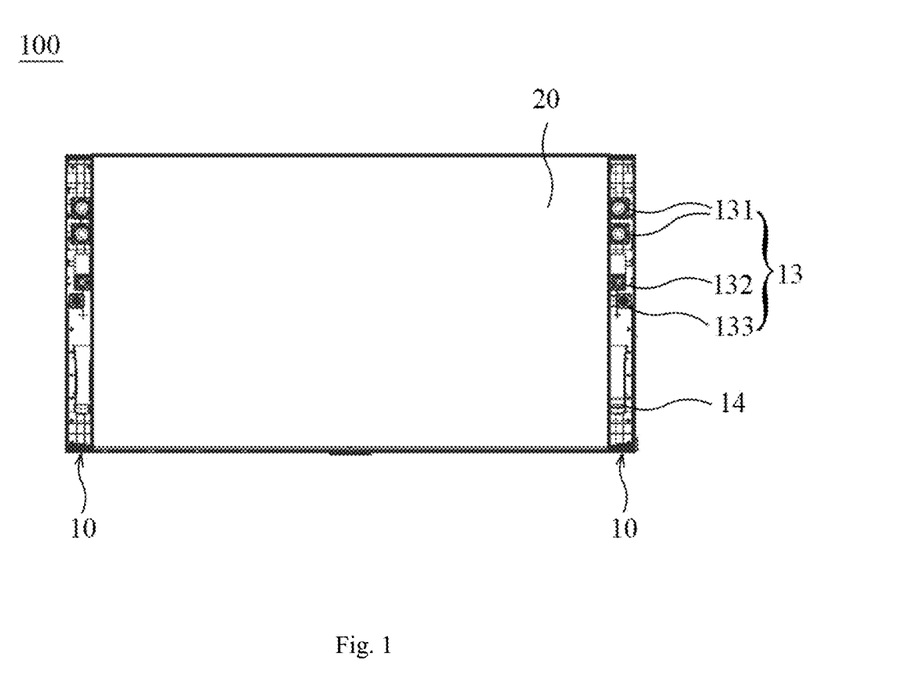
FIG. 1 is a schematic view of a display apparatus according to an embodiment of the present disclosure.

In order to solve the above technical problems, the present disclosure provides a sound box assembly 10, which may be applied to a display apparatus 100. The display apparatus 100 may be a television and includes a screen 20. As illustrated in FIG. 1, two sound box assemblies 10 are respectively arranged on both side portions of the display apparatus 100, and upper and lower ends of the sound box assembly 10 may be flush with upper and lower ends of the display apparatus 100, respectively, so as to increase an internal space of the sound box assembly 10, thereby improving the quality of the played sound. Especially for a bass, the improvement of the space of the sound box may improve the listening experience and achieve a stunning bass effect. According to a size of the display apparatus 100, a size of the sound box assembly 10 in a height direction, i.e. in a vertical up-down direction when the display apparatus 100 is arranged vertically, is consistent with the size of the display apparatus 100. For example, in the display apparatus 100 with a 75 inch, 80 inch or larger screen, a volume of the sound box assembly 10 may be 2.5 liters or more, so as to provide a better sound quality. Moreover, the sound box assembly 10 is arranged on the side of the display apparatus 100, so as to directly generate the sound to a front side of the display apparatus 100 when playing the sound, reduce an excessive interference of the sound reflected by walls or other objects on the direct sound of the sound box, obtain a good sense of positioning and a wide and deep sound field, and enable the user to hear the maximum, the most direct and the clearest details.

As illustrated in FIGS. 1-4, the sound box assembly 10 may include: a housing 11 in which a chamber is formed and to which a connecting part 12 is connected, the connecting part 12 being configured to be connected with the display apparatus 100; a loudspeaker 13 arranged in the chamber of the housing 11, a sound-image center being disposed at a center position of the display apparatus 100 when playing sound. The loudspeaker 13 may include a squawker 132 arranged at a middle portion of the housing 11, a woofer 131 and a tweeter 133. One of the woofer 131 and the tweeter 133 is arranged above the squawker 132 and the other one of the woofer 131 and the tweeter 133 is arranged below the squawker 132.

In this embodiment, the connecting part 12 may be directly connected with the housing 11 or fixedly connected with the housing 11 through a connector. Also, the connecting part 12 is further connected with the display apparatus 100, such that the sound box assembly 10 is connected with the display apparatus 100. The display apparatus 100 may include a moving part capable of moving to drive the connecting part 12 to move, so as to enable the sound box assembly 10 to move, which will be described in related embodiments later.

According to the arrangement of the sound box assembly 10 described above, the chamber formed in the housing 11 defines a relatively large space, so as to improve the sound quality, especially the bass generated by the woofer 131, which may produce the bass effect with high quality through the chamber of the large space.

Moreover, in this embodiment, the numbers of the woofers 131, the squawkers 132 and tweeters 133 may be one or more, respectively. In the drawings of the present disclosure, two woofers 131, one squawker 132 and one tweeter 133 are illustrated as an example, but the present disclosure is not limited to this. The squawker 132 is disposed at the middle portion of the housing 11 and may be arranged adjacent to a middle position in a vertical direction of the display apparatus 100. The woofer 131 may be disposed above the squawker 132 and the tweeter 133 may be disposed below the squawker 132. Or, the woofer 131 may be disposed below the squawker 132 and the tweeter 133 may be disposed above the squawker 132. Through the above arrangements, the sound-image center may be disposed at a middle height when the sound is being played, and the sound image may be disposed in a central position of the display apparatus 100 through left and right sound box assemblies 10, such that when watching an image of the display apparatus 100, the position of the virtual sound source that is heard is the same with the position of the image, which may bring a better experience to the user.

In an embodiment, as illustrated in FIGS. 1-4, the tweeter 133 may be disposed at the middle portion of the housing 11, and be arranged below the squawker 132. The tweeter 133 is arranged close to the squawker 132 and spaced from the squawker 132 by a first distance. The woofer 131 is disposed at an upper portion of the housing 11, and is arranged further away from the squawker 132 than the tweeter 133. The woofer 131 is spaced from the squawker 132 by a second distance. The second distance is greater than the first distance. In this embodiment, according to audio frequencies of different ranges and a range in which a common sound generally lies, the above arrangement can achieve that the overall sound image of the sound played from the loudspeaker 13 is disposed at the middle height, and the sound image is disposed in a center of the display apparatus 100 through the left and right sound box assemblies 10, such that the sound and the image are on the same screen, that is, the virtual sound source is disposed at the screen 20 of the display apparatus 100.

Figure 3:
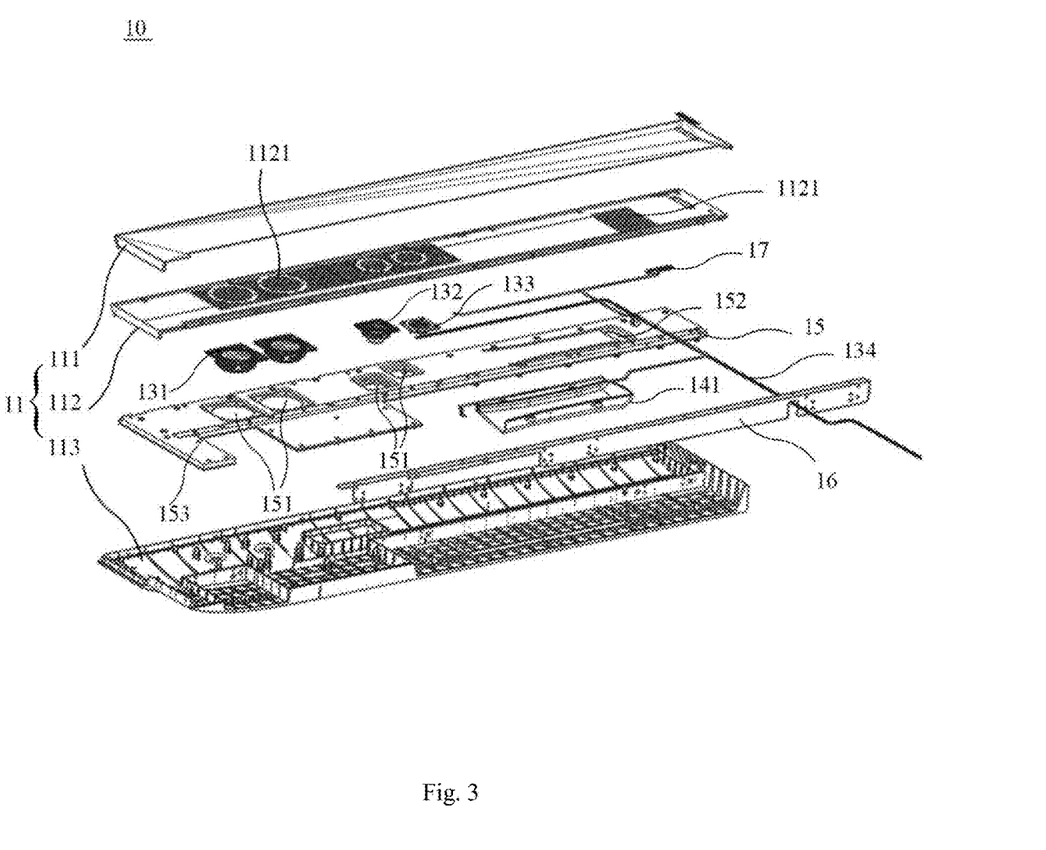
FIG. 3 is an exploded view of a sound box assembly according to an embodiment of the present disclosure.

In an embodiment, as illustrated in FIG. 1 and FIG. 3, the sound box assembly 10 may further include a bass reflex tube 14 arranged in the housing 11 and having a position corresponding to a position of the woofer 131. In this embodiment, the bass reflex tube 14 is arranged in the housing 11. The bass reflex tube 14 is a device that can transmit a vibration from rear to front of the loudspeaker, such that forward and rearward sound waves of the loudspeaker are both utilized, so as to improve the sound quality of the sound box. Moreover, according to the principle of the bass reflex tube 14, the bass reflex tube 14 can especially enhance the performance of an electronic sound, and the bass may descend to 42 Hz. Therefore, the bass reflex tube 14 is arranged at the position corresponding to the woofer 131. That is, the woofer 131 is disposed at the upper portion of the housing 11, and the bass reflex tube 14 is disposed at the lower portion of the housing 11. Or, the woofer 131 is disposed at the lower portion of the housing 11, and the bass reflex tube 14 is disposed at the upper portion of the housing 11, so as to further ensure the overall sound image of the sound box assembly 10 is in the middle position.

Figure 2:
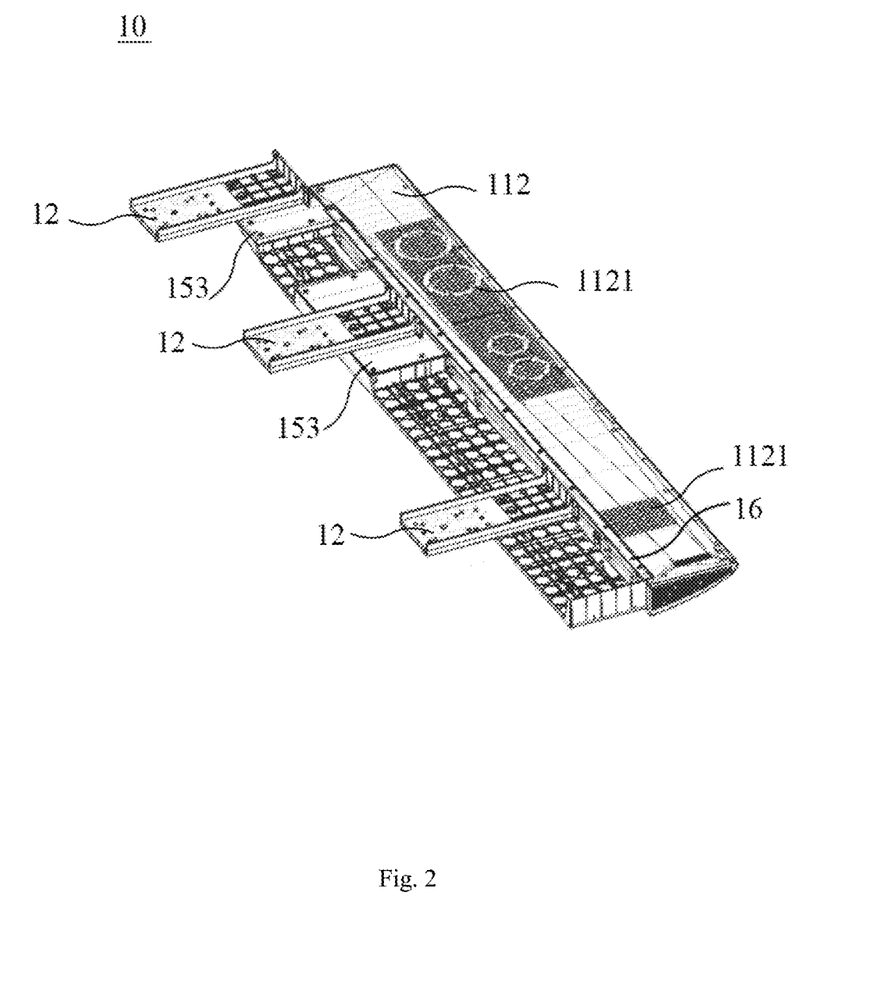
FIG. 2 is a schematic view of a sound box assembly without a cloth net according to an embodiment of the present disclosure.

In an embodiment, as illustrated in FIG. 2 and FIG. 3, the sound box assembly 10 may further include a bracket 15 arranged in the housing 11, a mounting hole 151 is formed in the bracket 15 and having a position corresponding to a position of the loudspeaker 13, and the loudspeaker 13 is mounted in the mounting hole 151. A sound guide hole 152 is formed in the bracket 15, and a sound guide groove 141 is arranged on a back side of bracket 15 and having a position corresponding to that of the sound guide hole 152. An opening of the sound guide groove 141 faces towards the woofer 131, and the sound guide groove 141 is connected with the back side of the bracket 15 to form the bass reflex tube 13.

In this embodiment, the bracket 15 may be arranged in the housing 11, and the mounting hole 151 is formed in the bracket 15 for receiving the loudspeaker 13. The number, position and opening size of the mounting hole 151 may be determined according to the numbers, positions and corresponding structures of the woofer 131, the squawker 132 and the tweeter 133. The loudspeaker 13 is mounted in the mounting hole 151, a front surface of the loudspeaker 13 faces towards a front side, i.e. a side of the screen 20 of the display apparatus 100, which displays the image, and a back surface of the loudspeaker 13 may be connected with a control circuit, a power supply circuit, or the like via the back side of the bracket 15 through a wiring 134.

The sound guide hole 152 is also formed in the bracket 15, and the sound guide groove 141 is arranged on the back side of the bracket 15 and having the position to that of the sound guide hole 152. The sound guide groove 141 is connected with the back side of the bracket 15, and has an opening facing towards the woofer 131 in its end, such that the vibration of the woofer 131, the squawker 132 and the tweeter 133 on the back side of the bracket 15 can be collected, and then the sound can be transmitted to the front side through the sound guide hole 152 and be played.

In some embodiments, a connecting plate 153 may be connected to the bracket 15, and configured to be connected with the connecting part 12. Since the loudspeaker 13 is mounted on the bracket 15, the bracket 15 has a relatively large weight. The connecting part 12 is directly connected to the connecting plate 153, which may reduce the force-supporting components, and the connecting part 12 directly achieves the support for the sound box assembly 10. In some embodiments, as illustrated in FIG. 2 and FIG. 3, the sound box assembly 10 may further include a reinforcing member 16, which may be fixed to the bracket 15 for reinforcement, and the connecting part 12 may also be connected to the reinforcing member 16 to achieve a multi-point connection and a multi-point support, thereby enabling the connection of the sound box assembly 10 to be more stable and reliable.

In an embodiment, as illustrated in FIG. 3 to FIG. 7, the sound box assembly 10 is connected to a moving part (not illustrated) of the display apparatus 100 through the connecting part 12, and can be moved between a first position and a second position in a left-right direction of the display apparatus 100. The first position is located on a back side of the screen 20 of the display apparatus 100, and the second position is located on a left or right side of the screen 20. The sound box assembly 10 further includes a distance sensor 17 arranged on a side of the housing 11 away from the screen 20. If a distance detected by the distance sensor is less than or equal to a distance threshold, the sound box assembly is prohibited from moving to the second position.

The left-right direction generally refers to a linear direction of the left and right sides of the display apparatus 100 when the display apparatus 100 is in use and the screen 20 faces towards the front side. If the display apparatus 100 is arranged vertically, that is, when the screen 20 is arranged perpendicular to a horizontal plane, the left-right direction is a horizontal direction. In this embodiment, the sound box assembly 10 may be configured to move relative to the screen 20, and the display apparatus 100 may include a moving part configured to move, a driving part configured to drive the moving part to move, etc. The sound box assembly 10 may be connected to the moving part through the connecting part 12, and the display apparatus 100 may drive the moving part to move through the driving part, so as to drive the sound box assembly 10 to move between the first position and the second position. The first position may be located on the back side of the screen and adjacent to left and right ends of the screen 20. When the sound box assembly 10 is in the first position, the user cannot observe the sound box assembly 10 from the front side of the display apparatus 100. The second position may be located on a left or right side of the screen 20. In some embodiments, the second position corresponds to the first position adjacent to the left end of the screen 20, and extends leftwards beyond the back side of the screen 20. When being in the second position, the sound box assembly 10 extends out of a boundary of the left side of the screen 20, so as to expose the loudspeaker 13 completely. Thus, the user can observe the sound box assembly 10 from the front side of the display apparatus 100, and the sound played by the sound box assembly 10 can also be transmitted to the user without being blocked and reflected. In some other embodiments, the second position corresponds to the first position adjacent to the right end of the screen 20, that is, there is also a second position on the right side of the screen 20, the principle of which is the same with that of the second position on the left side, and thus will not be repeated herein. In an audio output state, that is, when the sound needs to be played, for example, when the display apparatus 100 is turned on and ready to play a program or in the state of playing a program, the sound box assembly 10 may be moved to the second position so as to be exposed from the left or right side of the screen 20 of the display apparatus 100, thus playing the sound to the front side, which avoids sound quality from being damaged. When the audio output state ends, that is, when the sound does not need to be played, for example, the display apparatus 100 is turned off or in a standby state, the sound box assembly 10 may be moved to the first position, that is, the sound box assembly 10 is located on the back side of the screen 20, such that the appearance of the display apparatus 100 is simple and aesthetic. The sound box assembly 10 may be received in the housing of the display apparatus 100. The above movement may be a linear movement or a flipping movement, etc.

Figure 7:
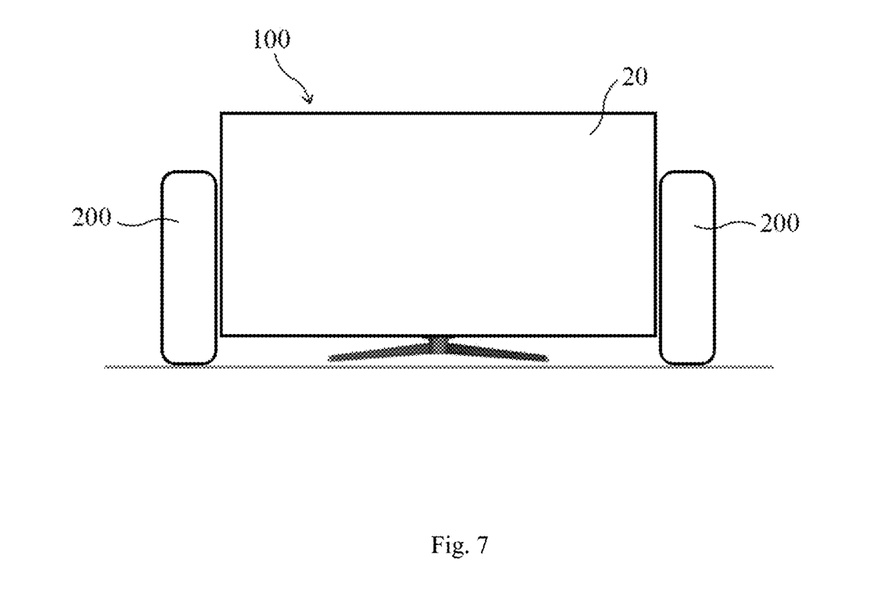
FIG. 7 is a schematic view of a display apparatus according to an embodiment of the present disclosure.
Figure 8:
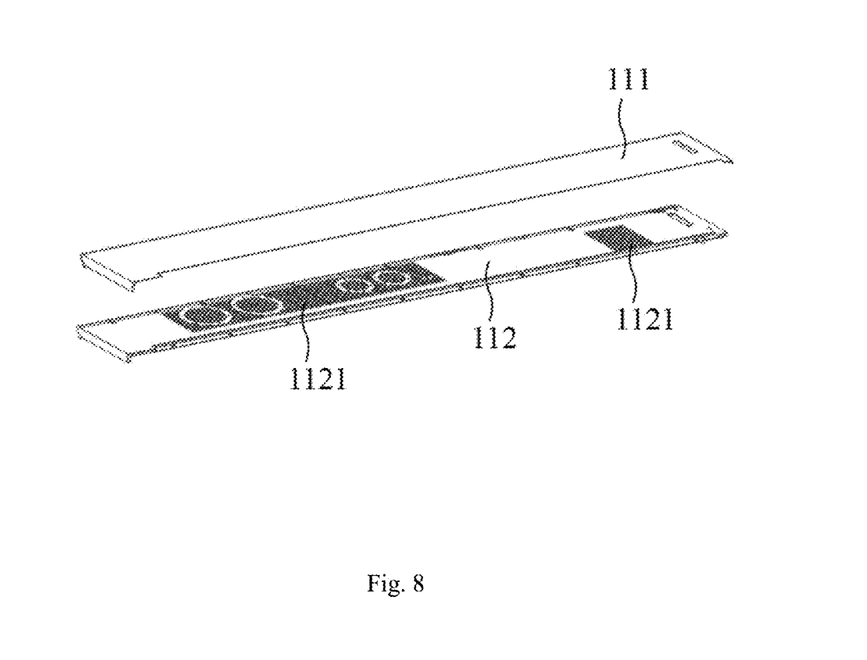
FIG. 8 is a schematic view of a cloth net and a grid frame of a sound box assembly according to an embodiment of the present disclosure.

In addition, the distance sensor 17 may be arranged on a side of the housing 11, i.e. the side away from the screen 20, for detecting whether there is an object on an outer side of the housing 11 and a distance to the object. As illustrated in FIG. 7, there may be an object 200 arranged on both sides of the display apparatus 100. When the sound box assembly 10 moves outwards, a collision may occur. Therefore, when it is detected by the distance sensor 17 that the distance to the object 200 is less than or equal to the distance threshold, the sound box assembly 10 may be prohibited from moving to the second position, so as to prevent the object from falling and colliding, and the sound box assembly 10 from being damaged. The distance threshold may be equal to or slightly greater than the distance between the second position and the first position, such that the movement is more reliable. For example, a distance extended by the sound box assembly 10, i.e. the distance between the second position and the first position, is 100 mm. The distance threshold may be set as 120 mm, and a detection angle of the distance sensor 17 may be greater than or equal to 120 degrees so as to ensure the reliability of detection.

In an embodiment, the distance sensor 17 may include a first distance sensor 171 disposed at the lower portion of the housing 11. Generally, the object is placed on the ground or table, so the object generally extends from bottom to top. In this embodiment, the first distance sensor 171 is disposed at the lower portion of the housing 11, and faces outwards, thereby better detecting the object and avoiding the failure of detecting the object because of being arranged at a high position.

Figure 4:
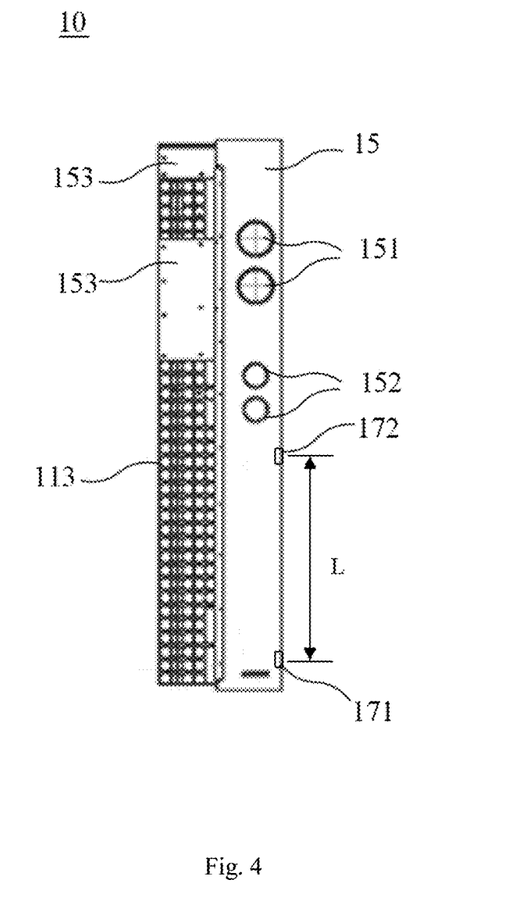
FIG. 4 is a schematic view of a sound box assembly without a cloth net and a grid frame according to an embodiment of the present disclosure.

In an embodiment, the distance sensor 17 may further include one or more second distance sensors 172 disposed above the first distance sensor 171. In some embodiments, the object placed on the side of the display apparatus 100 may have an irregular shape, such as some vases with a narrow bottom and a wide top, or objects extending from the side, such that the first distance sensor 171 arranged below may be unable to detect the object in the middle or above position. In this embodiment, in order to better detect the object and avoid the collision, one or more second distance sensors arranged above the first distance sensor 171 may be provided. For example, as illustrated in FIG. 4, only one second distance sensor 172 may be arranged in the middle of the housing 11, and the second distance sensor 172 may be 400 mm or other values higher than the first distance sensor 171.

In an embodiment, as illustrated in FIG. 3, FIG. 5, FIG. 6 and FIG. 8, the housing 11 may include a cloth net 111 covering an outer surface of the front side of the housing 11. In this embodiment, the cloth net 111 may be made of canvas or other materials, and the appearance is simple by arranging a whole cloth net 111 outside the housing 11. The cloth net 111 may cover the front side of the housing 11, the upper side, the lower side and the outer side of the housing 11, such that the observable surface is arranged as a whole.

Figure 5:
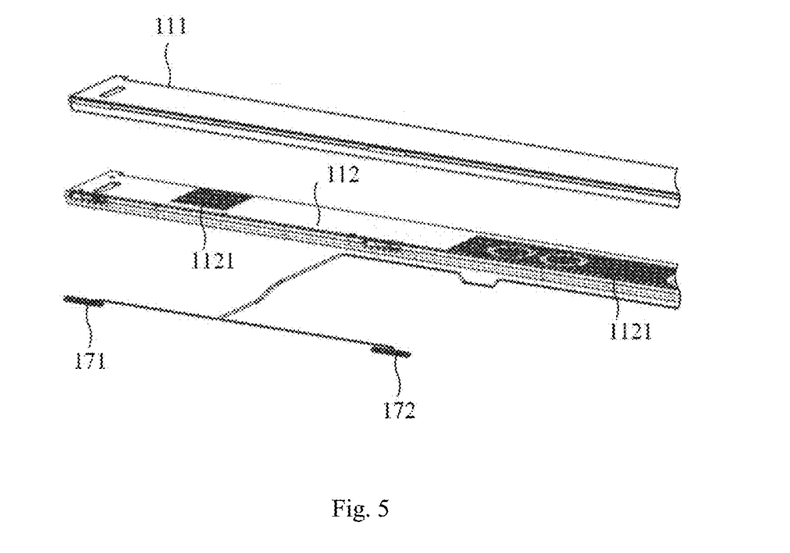
FIG. 5 is a partial schematic view of a sound box assembly according to an embodiment of the present disclosure.
Figure 6:
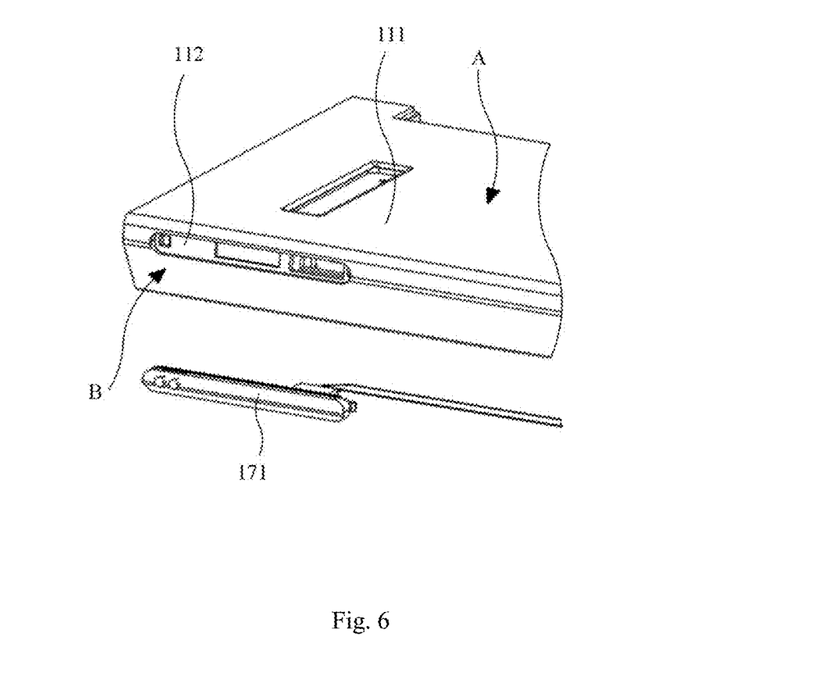
FIG. 6 is another partial schematic view of a sound box assembly according to an embodiment of the present disclosure.

In an embodiment, as illustrated in FIG. 2, FIG. 3, FIG. 5, FIG. 6 and FIG. 8, the housing 11 may further include a grid frame 112 and a rear housing 113. The grid frame 112 is snapped with the rear housing 113 to define the chamber. The grid frame 112 includes a sound output area 1121 having a position corresponding to the position of the loudspeaker 13, and the cloth net 111 covers an outer surface of the grid frame 112. In this embodiment, the grid frame 112 may be made of plastic and connected with the rear housing 113 by means of a snap. The connecting part 12 and the connecting plate 153 of the bracket 15 in the above embodiments may protrude out of the chamber. The grid frame 112 includes the sound output area 1121 configured in a hollow or another manner, and the sound output area 1121 has a position corresponding to the position of the loudspeaker 13, so as to avoid the influence on the sound output of the loudspeaker 13. In some embodiments, a portion of the grid frame 112 corresponding to the sound guide hole 152 also includes the sound output area 1121. The cloth net 111 may be covered on the outer surface of the grid frame 112 by means of glue spraying and adhering, so as to simplify the mounting. As illustrated in FIG. 5, the front side of the housing 11 is mainly formed by the cloth net 111 and the grid frame 112, and the cloth net 111 matches with the grid frame 112 so as to cover a front side and a side end surface of the grid frame 112. FIG. 6 shows a partial schematic view of the cloth net 111 and the grid frame 112 bonded with each other. As illustrated in FIG. 6, the cloth net 111 is covered on the front side (face A as illustrated in FIG. 6) and the side end face (face B as illustrated in FIG. 6) of the grid frame 112. Through this arrangement, the appearance of the sound box assembly 10 may have an integral visual effect, and the user experience may be improved. In addition, as illustrated in FIG. 5, the distance sensor 17 is arranged on the side of the sound box assembly 10. Specifically, as illustrated in FIG. 6, a through hole is formed in the side end face of the grid frame 112, and a through hole is also formed in the cloth net 111 in a corresponding position. The first distance sensor 171 is arranged in the housing 11, i.e. on an inner side of the through hole formed in the side end face of the grid frame 112. The first distance sensor 171 may be mounted to the cloth net 111 by means of snap-fit, and pass through the through holes of the grid frame 112 and the cloth net 111, so as to detect the external object and the distance to the external object. The mounting principle of the second distance sensor 172 is the same with that of the first distance sensor 171, which will not be repeated herein.

Based on the same conception, the present disclosure also provides a display apparatus 100. The display apparatus 100 includes two sound box assemblies 10 according to the above embodiments, the two sound box assemblies 10 are arranged on both sides of the display apparatus 100, respectively, and upper and lower ends of the sound box assembly 10 are flush with upper and lower ends of the display apparatus 100, respectively, so as to increase an internal space of the sound box assembly 10, thereby improving the quality of the played sound. Especially for a bass, the improvement of the space of the sound box may improve the listening experience and achieve a stunning bass effect. Moreover, the sound box assembly 10 is arranged on the side of the display apparatus 100, so as to directly play the sound to the front side of the display apparatus 100 when playing the sound, reduce an excessive interference of the sound reflected by walls or other objects on the direct sound of the sound box, obtain a good sense of positioning and a wide and deep sound field, and enable the user to hear the maximum, the most direct and the clearest details.

Figure 9:
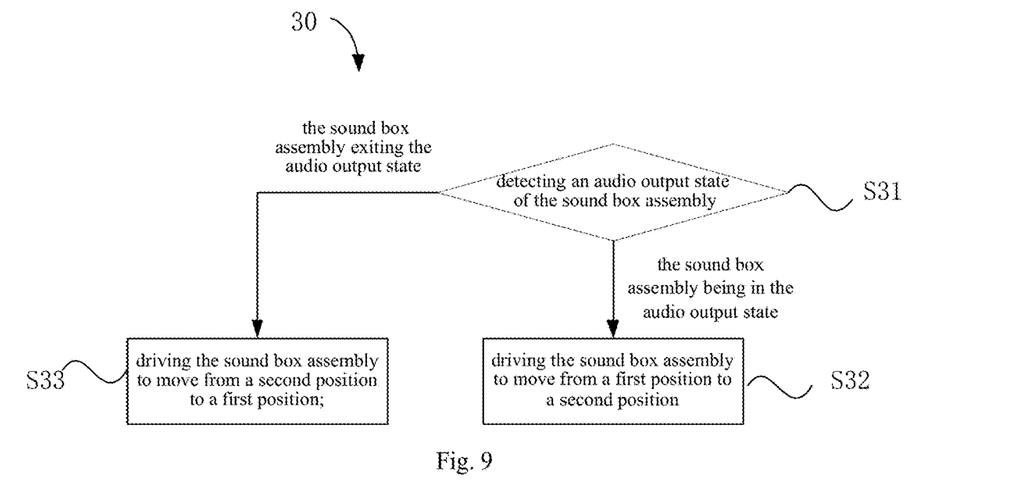
FIG. 9 is a flow chart of an audio output method according to another embodiment of the present disclosure.

Based on the same conception, the present disclosure further provides an audio output method 30, which may be applied to the display apparatus 100 of the above embodiments, such as a television, etc. As illustrated in FIG. 9, the audio output method 30 may include following steps.

At step S31, an audio output state of the sound box assembly 10 is detected.

If the sound box assembly 10 is in the audio output state, step S32 is executed. In step S32, the sound box assembly 10 is driven to move from the first position to the second position.

If the sound box assembly 10 exits the audio output state, step S33 is executed. In step S33, the sound box assembly 10 is driven to move from the second position to the first position.

The first position is disposed on the back side of the screen 20 of the display apparatus 100, and the second position is disposed on the left or right side of the screen 20.

The audio output method 30 according to the embodiments of the present disclosure may obtain the audio output state of the sound box assembly 10 according to a current state of the display apparatus 100. For example, when the display apparatus 100 is turned on and music needs to be played, the sound box assembly 10 is in the audio output state, ready to play or playing sound, and thus the sound box assembly 10 is driven to move from the first position to the second position through the moving part and the driving part of the display apparatus 1000, such that the sound box assembly 10 is exposed, and the loudspeaker may output the sound forwards, thereby ensuring the sound quality. If there is no need to play the sound at present, for example, when the display apparatus 100 is turned off or in a standby state, the sound box assembly 10 may be moved to the first position, i.e. on the back side of the screen 20, such that the appearance of the display apparatus 100 is simple and aesthetic. The sound box assembly 10 may be received in the housing of the display apparatus 100, and the above movement may be a linear movement or a flipping movement, etc.

Figure 10:
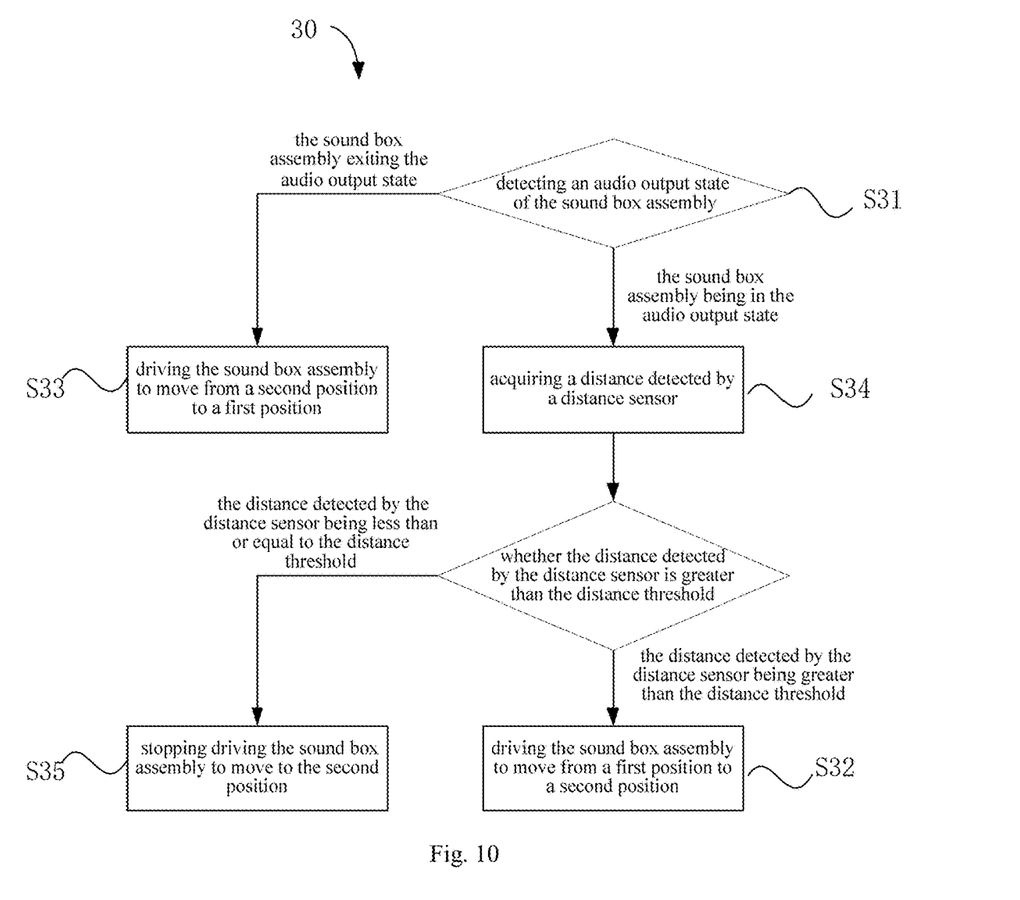
FIG. 10 is another flow chart of an audio output method according to another embodiment of the present disclosure.

In an embodiment, as illustrated in FIG. 10, the audio output method 30 may include step S34. In step S34, a distance detected by the distance sensor is acquired. If the distance detected by the distance sensor is less than or equal to the distance threshold, step S35 is executed. In step S35, the sound box assembly is stopped from being driven to move to the second position. If the distance detected by the distance sensor is greater than the distance threshold, step S32 is executed. Step S34 may be executed again when the sound box assembly 10 is in the audio output state. In this way, it is possible to avoid collisions which occur when the sound box assembly 10 is moved outwards with objects being arranged on both sides of the display apparatus 100.

Based on the same concept, the embodiments of the present disclosure also provide an audio output device 300.

It may be understood that the audio output device 300 provided by the embodiments of the present disclosure is intended to achieve the above functions and includes corresponding hardware structures and/or software modules for executing each function. In combination with the units and algorithm steps of each example disclosed in the embodiments of the present disclosure, the embodiments of the present disclosure may be achieved in the form of hardware or the combination of hardware and computer software. Whether a function is executed by the hardware or the computer software driven the hardware depends on the specific disclosure and design constraints of the technical solution. Those skilled in the art may use different methods to implement the described functions for each specific disclosure, but such implementation should not be considered beyond the scope of the technical solutions of the embodiments of the present disclosure.

Figure 11:
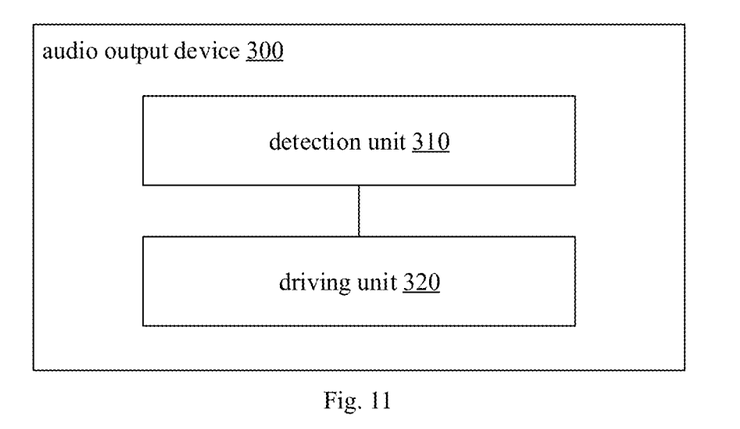
FIG. 11 is a block diagram of an audio output device according to an embodiment of the present disclosure.

FIG. 11 is a block diagram of an audio output device 300 according to an exemplary embodiment. The audio output device 300 may be applied to the display apparatus 100 in the above embodiments. As illustrated in FIG. 11, the audio output device 300 may include: a detection unit 310 for detecting the audio output state of the sound box assembly; and a driving unit 320 for driving the sound box assembly to move from the first position to the second position when the sound box assembly is in the audio output state, and also for driving the sound box assembly to move from the second position to the first position when the sound box assembly exits the audio output state. The first position is disposed on the back side of the screen of the display apparatus, and the second position is disposed on the left or right side of the screen.

Figure 12:
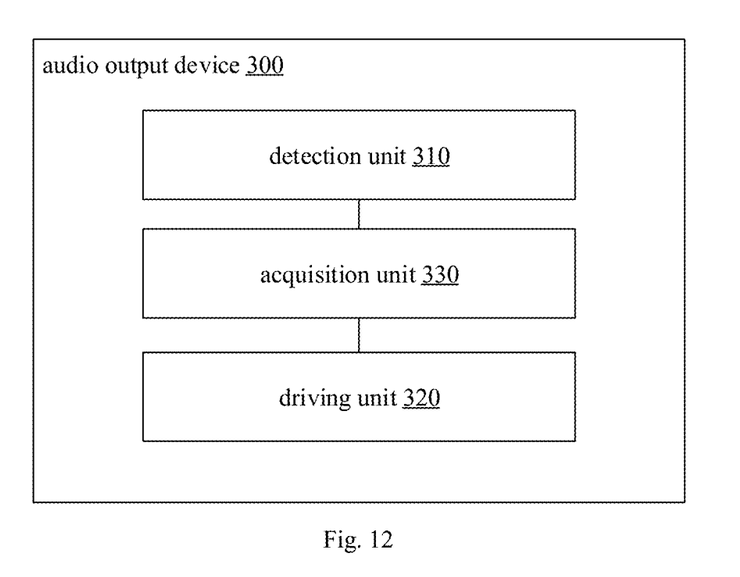
FIG. 12 is another block diagram of an audio output device according to an embodiment of the present disclosure.

In an embodiment, as illustrated in FIG. 12, the audio output device further includes an acquisition unit 330 for acquiring the distance detected by the distance sensor. The driving unit 320 is also configured to stop driving the sound box assembly to move to the second position when the distance detected by the distance sensor is less than or equal to the distance threshold.

With regard to the audio output device 300 in the above embodiments, the specific ways of each module executing operations have been described in detail in the embodiments related to the method, which will not be described in detail herein.

According to a first aspect of the embodiments of the present disclosure, a sound box assembly for a display apparatus is provided. The sound box assembly includes: a housing defining a chamber therein, and a connecting part connected to the housing and configured to be connected with the display apparatus; and a loudspeaker arranged in the chamber of the housing, a sound-image center being disposed at a center position of the display apparatus when the loudspeaker playing sound. The loudspeaker includes: a squawker arranged at a middle portion of the housing; and a woofer and a tweeter. One of the woofer and the tweeter is arranged above the squawker, and the other one of the woofer and the tweeter is arranged below the squawker.

In an embodiment, the tweeter is disposed at the middle portion of the housing, arranged below the squawker, and spaced from the squawker by a first distance, the woofer is disposed at an upper portion of the housing, and spaced from the squawker by a second distance, and the second distance is greater than the first distance.

In an embodiment, the sound box assembly further includes a bass reflex tube arranged in the housing and has a position corresponding to a position of the woofer.

In an embodiment, the sound box assembly further includes a bracket arranged in the housing. A mounting hole is formed in the bracket and has a position corresponding to a position of the loudspeaker, and the loudspeaker is mounted in the mounting hole. A sound guide hole is formed in the bracket, a sound guide groove is arranged on a back side of the bracket and having a position corresponding to that of the sound guide hole, an opening of the sound guide groove faces towards the woofer, and the sound guide groove is connected to the back side of the bracket to form the bass reflex tube.

In an embodiment, the sound box assembly is connected to a moving part of the display apparatus through the connecting part, and configured to move between a first position and a second position in a left-right direction of the display apparatus. The first position is located on a back side of a screen of the display apparatus, and the second position is located on a left or right side of the screen. The sound box assembly further includes a distance sensor arranged on a side of the housing away from the screen. The sound box assembly is configured to be prohibited from moving to the second position when a distance detected by the distance sensor is less than or equal to a distance threshold.

In an embodiment, the distance sensor includes a first distance sensor disposed at a lower portion of the housing.

In an embodiment, the distance sensor further includes one or more second distance sensors disposed above the first distance sensor.

In an embodiment, the housing includes a cloth net covering an outer surface of a front side of the housing.

In an embodiment, the housing further includes a grid frame and a rear housing. The grid frame is snapped with the rear housing to define the chamber, the grid frame includes a sound output area having a position corresponding to a position of the loudspeaker, and the cloth net covers an outer surface of the grid frame.

According to a second aspect of the embodiments of the present disclosure, a display apparatus is provided, and includes two sound box assemblies according to the first aspect, and the two sound box assemblies are arranged on both sides of the display apparatus, respectively.

According to a third aspect of the embodiments of the present disclosure, an audio output method for the display apparatus according to the second aspect is provided. The audio output method includes: detecting an audio output state of the sound box assembly; driving the sound box assembly to move from a first position to a second position when the sound box assembly is in the audio output state; and driving the sound box assembly to move from the second position to the first position when the sound box assembly exits the audio output state. The first position is disposed on a back side of the screen of the display apparatus, and the second position is disposed on a left or right side of the screen.

In an embodiment, the audio output method further includes: acquiring a distance detected by the distance sensor; and stopping driving the sound box assembly to move to the second position when the distance detected by the distance sensor is less than or equal to a distance threshold.

According to a fourth aspect of the embodiments of the present disclosure, an audio output device for the display apparatus according to the second aspect is provided. The audio output device includes: a detection unit for detecting an audio output state of the sound box assembly; and a driving unit for driving the sound box assembly to move from a first position to a second position when the sound box assembly is in the audio output state, and for driving the sound box assembly to move from the second position to the first position when the sound box assembly exits the audio output state. The first position is disposed on a back side of the screen of the display apparatus, and the second position is disposed on a left or right side of the screen.

In an embodiment, the audio output device further includes an acquisition unit for acquiring a distance detected by the distance sensor. The driving unit is also configured to stop driving the sound box assembly to move to the second position when the distance detected by the distance sensor is less than or equal to a distance threshold.

According to a fifth aspect of the embodiments of the present disclosure, a non-temporary computer-readable storage medium is provided. The audio output method according to the third aspect is achieved when instructions in the storage medium are executed by a processor.

The technical solution provided by the embodiments of the present disclosure may have the following advantageous effects.

Through arranging the sound box assemblies on both sides of the display apparatus, the upper and lower ends of the sound box assembly are flush with the upper and lower ends of the display apparatus, so as to increase a volume of the sound box assembly, and improve the sound effect, especially for a bass. Further, the sound-image center is disposed at the center position of the display apparatus when playing sound, which solves the problem of separation of the sound and the image of the traditional television with a built-in loudspeaker, thus enhancing the quality of the sound and the image, and improving the user experience.

Figure 13:
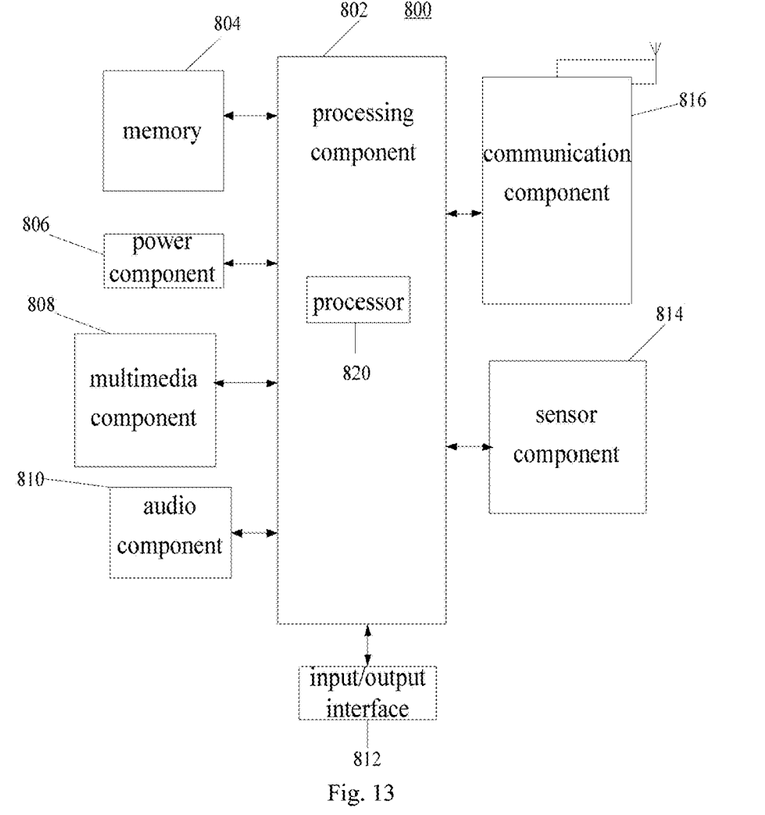
FIG. 13 is a block diagram of an apparatus according to an embodiment of the present disclosure.

FIG. 13 is a block diagram of an apparatus for audio output according to an exemplary embodiment. For example, the apparatus 800 may be a mobile phone, a computer, a digital broadcasting terminal, a message receiving and sending device, a game console, a tablet device, a medical facility, a fitness facility, a personal digital assistant, etc.

As illustrated in FIG. 13, the apparatus 800 may include one or more of the following components: a processing component 802, a memory 804, a power component 806, a multimedia component 808, an audio component 810, an input/output (I/O) interface 812, a sensor component 814, and a communication component 816.

The processing component 802 usually controls the overall operation of apparatus 800, such as operations associated with display, telephone call, data communication, camera operation and recording operation. The processing component 802 may include one or more processors 820 to execute instructions to complete all or part of the steps of the methods described above. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operation at the apparatus 800. Examples of these data include instructions for any disclosure or method that operates on the apparatus 800, such as contact data, phone book data, messages, images, videos, etc. The memory 804 may be achieved by any type of volatile or non-volatile storage devices or their combination, such as a static random access memory (SRAM), an electrically erasable programmable read only memory (EEPROM), an erasable programmable read-only memory (EPROM), a programmable read-only memory (PROM), a read-only memory (ROM), a magnetic memory, a flash memory, a magnetic or optical disc.

The power component 806 provides power for various components of the apparatus 800. The power component 806 may include a power management system, one or more power sources, and other components associated with generating, managing and distributing power for the apparatus 800.

The multimedia component 808 includes a screen providing an output interface between the apparatus 800 and a user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touch, sliding and gestures on the touch panel. The touch sensor may not only sense the boundary of the touch or sliding operation, but also detect the duration and pressure associated with the touch or sliding operation. In some embodiments, the multimedia component 808 may include a front camera and/or a rear camera. When the apparatus 800 is in an operational mode, such as a shooting mode or a filming mode, the front camera and/or rear cameras may receive external multimedia data. Each of the front camera and the rear cameras may be a fixed optical lens system with focal length and optical zoom capability.

The audio component 810 is configured to output and/or input audio signals. For example, the audio component 810 includes a microphone (MIC). When the apparatus 800 is in an operational mode, such as a calling mode, a recording mode and a speech recognition mode, the microphone is configured to receive external audio signals. The received audio signal may be further stored in the memory 804 or transmitted via the communication component 816. In some embodiments, the audio component 810 also includes a loudspeaker for outputting audio signals.

The I/O interface 812 is configured to provide interface between the processing component 802 and a peripheral interface module, the above peripheral interface module may be a keyboard, a click wheel, a button, etc. The button may include, but is not limited to, a home page button, a volume button, a starting button and a locking button.

The sensor component 814 includes one or more sensors to provide status assessments of various aspects of the apparatus 800. For example, the sensor component 814 may detect the on/off state of the apparatus 800, relative positioning of components, such as a display and a keypad of apparatus 800. The sensor component 814 may also detect the position change of the apparatus 800 or a component of the apparatus 800, and presence or absence of user contact with the apparatus 800, the orientation or acceleration/deceleration of the apparatus 800 and the temperature change of the apparatus 800. The sensor component 814 may include a proximity sensor configured to detect the presence of a nearby object without any physical contact. The sensor component 814 may also include an optical sensor, such as a CMOS or CCD image sensor, so as to be used in imaging disclosures. In some embodiments, the sensor component 814 may also include an acceleration sensor, a gyroscope sensor, a magnetic sensor, a pressure sensor or a temperature sensor.

The communication component 816 is configured to facilitate wired or wireless communication between the apparatus 800 and other devices. The apparatus 800 may access wireless networks based on communication standards, such as WiFi, 2G or 3G, or their combinations. In an exemplary embodiment, the communication component 816 receives broadcast signals or broadcast related information from an external broadcast management system via a broadcast channel. In an exemplary embodiment, the communication component 816 also includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth (BT) technology and other technologies.

In an exemplary embodiment, the apparatus 800 may be implemented by one or more disclosure specific integrated circuits (ASIC), digital signal processors (DSPs), digital signal processing devices (DSPDs), programmable logic devices (PLDs), field programmable gate arrays (FPGAs), controllers, microcontrollers, microprocessors or other electronic components by performing the above methods.

In the exemplary embodiment, a non-temporary computer-readable storage medium including instructions is provided, such as a memory 804 including instructions, and the above instructions may be executed by the processor 820 of the apparatus 800 so as to accomplish the above method. For example, the non-temporary computer-readable storage medium may be a ROM, a random access memory (RAM), a CD-ROM, a magnetic tape, a floppy disk, an optical data storage device, etc.

Figure 14:
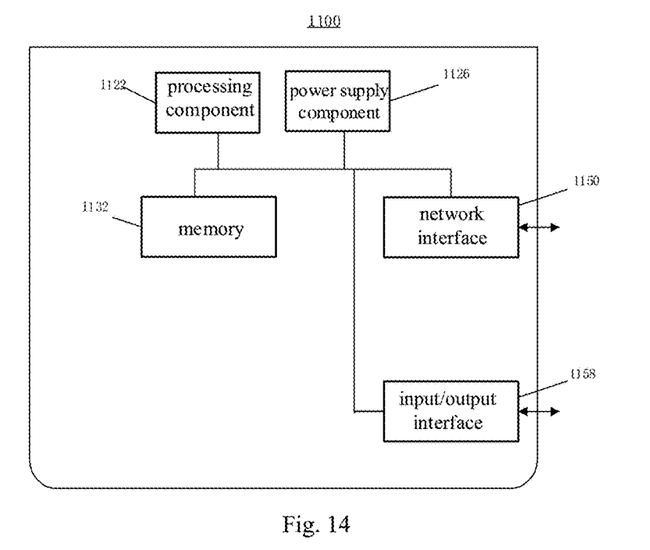
FIG. 14 is a block diagram of an apparatus according to an embodiment of the present disclosure.

FIG. 14 is a block diagram of an audio output device 1100 according to an exemplary embodiment. For example, the device 1100 may be provided as a server. As illustrated in FIG. 14, the device 1100 includes a processing component 1122, which further includes one or more processors and a memory resource represented by a memory 1132 for storing instructions, such as disclosures, that may be executed by the processing component 1122. The disclosure stored in memory 1132 may include one or more modules, each corresponding to a set of instructions. In addition, the processing component 1122 is configured to execute an instruction to implement the above described audio output method.

The device 1100 may further include a power supply component 1126 configured to execute a power management of the device 1100, a wired or wireless network interface 1150 configured to connect the device 1100 to a network, and an input/output (I/O) interface 1158. The device 1100 may operate an operating system based on the instructions stored in the memory 1132, such as windows Server™, Mac OS X™, Unix™, Linux™, FreeBSD™ or the like.

It should be understood that "a plurality of" in the present disclosure refers to two or more than two, which is similar to other quantifiers. The expression "and/or" describes the association relationship of associated objects, which means that there may be three kinds of relationships For example, A and/or B, refers to that there are three kinds of situations, namely only A, A and B at the same time, and only B. The character "/" generally indicates that the associated objects are in an "or" relationship. The singular forms of "one", "said" and "the" are also intended to include plural forms, unless clearly indicated in the context otherwise.

It should be understood that, although terms such as first and second are used herein for describing various kinds of information in this disclosure, such information should not be limited to these terms. These terms are only used for distinguishing the same type of information from each other, and do not indicate a particular order or a degree of importance. In fact, the terms "first" and "second" may be used interchangeably. For example, without departing from the scope of this disclosure, a first information may also be called as a second information, and similarly, the second information may also be called as the first information.

It should be further understood that, terms such as "central," "longitudinal," "lateral," "front", "rear", "upper," "lower," "left," "right," "vertical," "horizontal," "top," "bottom," "inner," and "outer" indicate the orientation or position relationship based on the orientation or position relationship illustrated in the drawings, which are only intended for convenience of description or for simplifying description of the present embodiment, and do not alone indicate or imply that the device or element referred to must have a particular orientation or be constructed and operated in a specific orientation.

It should be further understood that, unless specified otherwise, the term "connected" includes a direct connection without other members, and an indirect connection via other elements therebetween.

It should be further understood that, in the embodiments of the present disclosure, the operations are described in a specific order in the drawings, which cannot be construed that these operations are required to execute in a specific or serial order as illustrated, or execute all the illustrated operations to obtain the desired results. Multitasking and parallel processing may be advantageous in a particular environment.

Other embodiments of the disclosure will be apparent to those skilled in the art from consideration of the specification and practice of the disclosure disclosed here. This disclosure is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. A sound box assembly for a display apparatus, comprising:
a housing defining a chamber therein, a connecting part connected to the housing, and configured to be connected with the display apparatus; and
a loudspeaker arranged in the chamber of the housing, a sound-image center being disposed at a center position of the display apparatus when the loudspeaker playing sound;
wherein the loudspeaker comprises:
a squawker arranged at a middle portion of the housing, the middle portion of the housing comprising a region of the housing adjacent to a middle position of the housing; and
a woofer and a tweeter, one of the woofer and the tweeter being arranged above the squawker, and the other one of the woofer and the tweeter being arranged below the squawker,
wherein the tweeter is disposed at the middle portion of the housing, arranged below the squawker, and spaced from the squawker by a first distance; and
the woofer is disposed at an upper portion of the housing, and spaced from the squawker by a second distance,
wherein the second distance is greater than the first distance.

2. The sound box assembly according to claim 1, further comprising:
a bass reflex tube arranged in the housing and having a position corresponding to a position of the woofer.

3. The sound box assembly according to claim 2, further comprising a bracket connected in the housing, and a mounting hole being formed in the bracket and having a position corresponding to a position of the loudspeaker, and the loudspeaker being mounted in the mounting hole,
wherein a sound guide hole is formed in the bracket, a sound guide groove is arranged on a back side of the bracket and having a position corresponding to that of the sound guide hole, an opening of the sound guide groove faces towards the woofer, and the sound guide groove is connected with the back side of the bracket to form the bass reflex tube.

4. The sound box assembly according to claim 1, wherein the sound box assembly is connected to a moving part of the display apparatus through the connecting part, and configured to move between a first position and a second position in a left-right direction of the display apparatus, wherein the first position is located on a back side of a screen of the display apparatus, and the second position is located on a left or right side of the screen;
wherein the sound box assembly further comprises:
a distance sensor arranged on a side of the housing away from the screen, the sound box assembly being configured to be prohibited from moving to the second position when a distance detected by the distance sensor is less than or equal to a distance threshold.

5. The sound box assembly according to claim 4, wherein the distance sensor comprises:
a first distance sensor disposed at a lower portion of the housing.

6. The sound box assembly according to claim 5, wherein the distance sensor further comprises:
one or more second distance sensors disposed above the first distance sensor.

7. The sound box assembly according to claim 1, wherein the housing comprises a cloth net covering an outer surface of a front side of the housing.

8. The sound box assembly according to claim 7, wherein the housing further comprises a grid frame and a rear housing,
wherein the grid frame is snapped with the rear housing to define the chamber;
the grid frame comprises a sound output area having a position corresponding to a position of the loudspeaker; and
the cloth net covers an outer surface of the grid frame.

9. A display apparatus, comprising:
a screen; and
two sound box assemblies arranged on both sides of the screen, respectively, the sound box assembly comprising:
a housing defining a chamber therein, and a connecting part connected to the housing, and configured to be connected with the display apparatus; and
a loudspeaker arranged in the chamber of the housing, a sound-image center being disposed at a center position of the display apparatus when the loudspeaker playing sound;
wherein the loudspeaker comprises:
a squawker arranged at a middle portion of the housing, the middle portion of the housing comprising a region of the housing adjacent to a middle position of the housing; and
a woofer and a tweeter, one of the woofer and the tweeter being arranged above the squawker, and the other one of the woofer and the tweeter being arranged below the squawker,
wherein the tweeter is disposed at the middle portion of the housing, arranged below the squawker, and spaced from the squawker by a first distance; and
the woofer is disposed at an upper portion of the housing, and spaced from the squawker by a second distance,
wherein the second distance is greater than the first distance.

10. The display apparatus according to claim 9, wherein the sound box assembly further comprises:
a bass reflex tube arranged in the housing and having a position corresponding to a position of the woofer.

11. The display apparatus according to claim 10, wherein the sound box assembly further comprises a bracket arranged in the housing, a mounting hole is formed in the bracket and has a position corresponding to a position of the loudspeaker, and the loudspeaker is mounted in the mounting hole,
wherein a sound guide hole is formed in the bracket, a sound guide groove is arranged on a back side of the bracket and having a position corresponding to that of the sound guide hole, an opening of the sound guide groove faces towards the woofer, and the sound guide groove is connected with the back side of the bracket to form the bass reflex tube.

12. The display apparatus according to claim 9, further comprising a moving part, wherein the sound box assembly is connected to the moving part through the connecting part, and configured to move between a first position and a second position in a left-right direction of the display apparatus, wherein the first position is located on a back side of a screen of the display apparatus, and the second position is located on a left or right side of the screen;

wherein the sound box assembly further comprises:
a distance sensor arranged on a side of the housing away from the screen, the sound box assembly being configured to be prohibited from moving to the second position when a distance detected by the distance sensor is less than or equal to a distance threshold.

13. The display apparatus according to claim 12, wherein the distance sensor comprises:
a first distance sensor disposed at a lower portion of the housing.

14. The display apparatus according to claim 13, wherein the distance sensor further comprises:
one or more second distance sensors disposed above the first distance sensor.

15. The display apparatus according to claim 9, wherein the housing comprises a cloth net covering an outer surface of a front side of the housing.

16. The display apparatus according to claim 15, wherein the housing further comprises a grid frame and a rear housing,
wherein the grid frame is snapped with the rear housing to define the chamber;
the grid frame comprises a sound output area having a position corresponding to a position of the loudspeaker; and
the cloth net covers an outer surface of the grid frame.

17. An audio output method for a display apparatus, the display apparatus comprising a screen and two sound box assemblies arranged on both sides of the screen, respectively, the audio output method comprising:
detecting an audio output state of the sound box assembly;
driving the sound box assembly to move from a first position to a second position when the sound box assembly is in the audio output state; and
driving the sound box assembly to move from the second position to the first position when the sound box assembly exits the audio output state,
wherein the first position is disposed on a back side of the screen, and the second position is disposed on a left or right side of the screen,
wherein each sound box assembly comprises:
a housing defining a chamber therein, a connecting part connected to the housing, and configured to be connected with the display apparatus; and
a loudspeaker arranged in the chamber of the housing, a sound-image center being disposed at a center position of the display apparatus when the loudspeaker playing sound;
wherein the loudspeaker comprises:
a squawker arranged at a middle portion of the housing, the middle portion of the housing comprising a region of the housing adjacent to a middle position of the housing; and
a woofer and a tweeter, one of the woofer and the tweeter being arranged above the squawker, and the other one of the woofer and the tweeter being arranged below the squawker,
wherein the tweeter is disposed at the middle portion of the housing, arranged below the squawker, and spaced from the squawker by a first distance; and
the woofer is disposed at an upper portion of the housing, and spaced from the squawker by a second distance,
wherein the second distance is greater than the first distance.

18. The audio output method according to claim 17, further comprising:
acquiring a distance detected by a distance sensor;
stopping driving the sound box assembly to move to the second position when the distance detected by the distance sensor is less than or equal to a distance threshold.

* * * * *